United States Patent [19]

Boudreault

[11] Patent Number: 4,919,303
[45] Date of Patent: Apr. 24, 1990

[54] METHOD FOR FEEDING PARTICULATE MATERIAL

[75] Inventor: Ghislain Boudreault, Chicoutimi, Canada

[73] Assignee: Alcan International Limited, Montreal, Canada

[21] Appl. No.: 241,360

[22] Filed: Sep. 7, 1988

Related U.S. Application Data

[63] Continuation-in-part of Ser. No. 869,007, May 30, 1986, abandoned.

[30] Foreign Application Priority Data

Jun. 6, 1986 [GB] United Kingdom ................. 8514287

[51] Int. Cl.⁵ .......................... B67B 1/00; B67B 3/00; B65G 53/40; C25C 3/00
[52] U.S. Cl. ........................................ 222/1; 222/637; 204/245; 406/134; 406/143
[58] Field of Search .................. 222/630, 195, 1, 637; 406/134, 137, 142, 143; 204/245

[56] References Cited

U.S. PATENT DOCUMENTS

| | | | |
|---|---|---|---|
| 738,172 | 9/1903 | Edwards | 406/86 X |
| 3,833,153 | 9/1974 | Somogyi | 222/630 X |
| 3,995,771 | 12/1976 | Olivier | 222/195 X |
| 4,299,683 | 11/1981 | Adorno et al. | 204/246 |
| 4,435,255 | 3/1984 | Casdas | 204/245 X |
| 4,498,818 | 2/1985 | Bjarnason et al. | 406/137 |
| 4,525,105 | 6/1985 | Jaggi | 204/245 X |

Primary Examiner—Donald R. Valentine
Attorney, Agent, or Firm—Cooper & Dunham

[57] ABSTRACT

Method of feeding particulate material by the use of apparatus comprising a passage having an upstream section 10 provided with baffles 18, 20, leading to a chicane 14, 16 and then to a downstream section 12. A gas pipe 22 feeds low-pressure gas to a slot 26 through which a flow of gas can be started or stopped, so as to start or stop the passage of the material through the chicane.

4 Claims, 2 Drawing Sheets

METHOD FOR FEEDING PARTICULATE MATERIAL

This is a continuation-in-part of application Ser. No. 869,007, filed May 30, 1986, now abandoned.

This invention relates to a method of feeding particulate material having two characteristic features. First, the amount of material fed can be accurately controlled by a timer, and can thus be varied at will. Second, the rate of feed of material can be arranged to be quite slow.

The invention is applicable to feeding any particular material. However, the invention was made in response to a particular problem which arises in connection with feeding alumina to aluminium reduction cells. These cells use a cryolite-based electrolyte containing dissolved alumina, and the alumina concentration needs to be carefully controlled in order to maintain efficient operation of the cell. In particular, if the alumina concentration falls too low, an anode effect results which involves breakdown of the operation of the cell and requires immediate corrective action. In modern cells it is conventional to supply a shot of particular alumina several times a minute.

The molten cell electrolyte is in constant movement and this continuously removes alumina from the point of feed and permits its dissolution in the electrolyte. If a shot of alumina is fed too rapidly, it may pass through the electrolyte without being dissolved and form sludge on the floor of the cell; or it may block the hole in the solid crust covering the cell through which feed is effected. It is in practice somewhat difficult to feed a shot of alumina at a rate sufficiently slowly for it to be taken up and dissolved in the electrolyte.

Canadian Pat. 1022497 describes a device for feeding alumina to a reduction cell. This includes a metering receptacle of variable volume and a fluidized bed tap which is switched on in order to empty the receptacle and switching off while the receptacle is again filled. The device has various disadvantages. The primary control of the amount of alumina fed is volumetric and this cannot be changed at will. The fluidizing membrane is liable to blockage by fine dust, oil or humidity which may be present in the fluidizing air, or may catch fire in the hot environment. The rate of feed is too rapid for convenience, but could not easily be reduced without risk of blockage.

French Pat. 1376385 describes a different device for feeding alumina to a reduction cell. This device comprises an S-shaped pipe leading from the bottom of a container for the alumina and a gas jet positioned to blow the alumina round the S-shaped pipe. This device also has several disadvantages. The high velocity gas causes abrasion of the inner walls of the pipe by sandblasting, which results in contamination of the feed material. With the gas switched on, the rate of feed is too fast for convenience and could not be slowed down by reducing the diameter of the S-shaped pipe without danger of blockage.

The present invention provides a method of feeding particulate material by the use of apparatus comprising a passage having a floor, an upstream section for receiving the material and conveying it in a downward direction, and a downstream section for delivering the material, the two sections being connected by a chicane consisting of a horizontal or upwardly inclined section of the passage of sufficient length to cause the particulate material to come to rest therein in the absence of a flow of gas there-through, a baffle system in the upstream section to control the rate of flow of the material to the chicane, a pipe leading to a slot within the passage, the slot extending horizontally adjacent the floor of the passage and facing downstream near the upstream end of the chicane, which method comprises passing through the slot air compressed at a pressure below one meter of water gauge and starting and stopping the passage of air at predetermined intervals so as to start and stop the flow of the particular material.

The chicane is a section of the passage which extends horizontally or in an inclined upward direction. The shape of the chicane is designed, having regard to angle of repose of the particulate material, to stop any flow of particulate material when gas is not passing through the slot.

The baffle system in the upstream section of the passage is designed to control the rate of flow of the particulate material to the chicane. It may comprise two or more baffles mounted on opposite sides of the passage to cause the particulate material to follow a tortuous path. Or the upstream section of the passage may be so shaped as to force the particulate material to follow a tortuous path. It would be possible to control the rate of flow of particulate material by means of a constriction in the upstream section of the passage, but this is not preferred owing to the danger of blockage.

The slot, and the means of passing gas through it, acts as an on-off tap to start and stop the feed of particular material. The slot preferably extends horizontally near the bottom of the passage so as to be immersed at all times in particular material. The gas is preferably air supplied at low excess pressure so as to avoid abrasion problems, just sufficient to disturb the base of a static pile of particulate material that cause the material to flow around the chicane.

BRIEF DESCRIPTION OF THE DRAWINGS:

Referring to FIG. 1, apparatus for feeding particulate material comprises a passage having an upstream section 10 for receiving the material and conveying it in a downward direction, and a downstream section 12 for delivering the material. The two sections are connected by an inclined chicane defined by an upper wall 14 and a lower wall 16. The width of the passage (in a direction perpendicular to the figure) is 63.5 mm, and each side of the passage is closed by vertical plates (not shown). Mounted on opposite sides of the upstream section of the passage are two horizontally extending baffles 18, 20, each extending half way across the passage. These baffles force the particulate material to follow a tortuous path as it descends to the passage, and so control the rate of flow of material to the chicane. A gas pipe 22 (of circular cross section (leads to a distribution chamber 24 extending the whole width of the passage and a horizontal slot 26 defined by a wall of the distribution chamber 24 and by a wall of the passage 10. The slot faces downstream and is positioned at the upstream end of the chicane.

Figure 1:
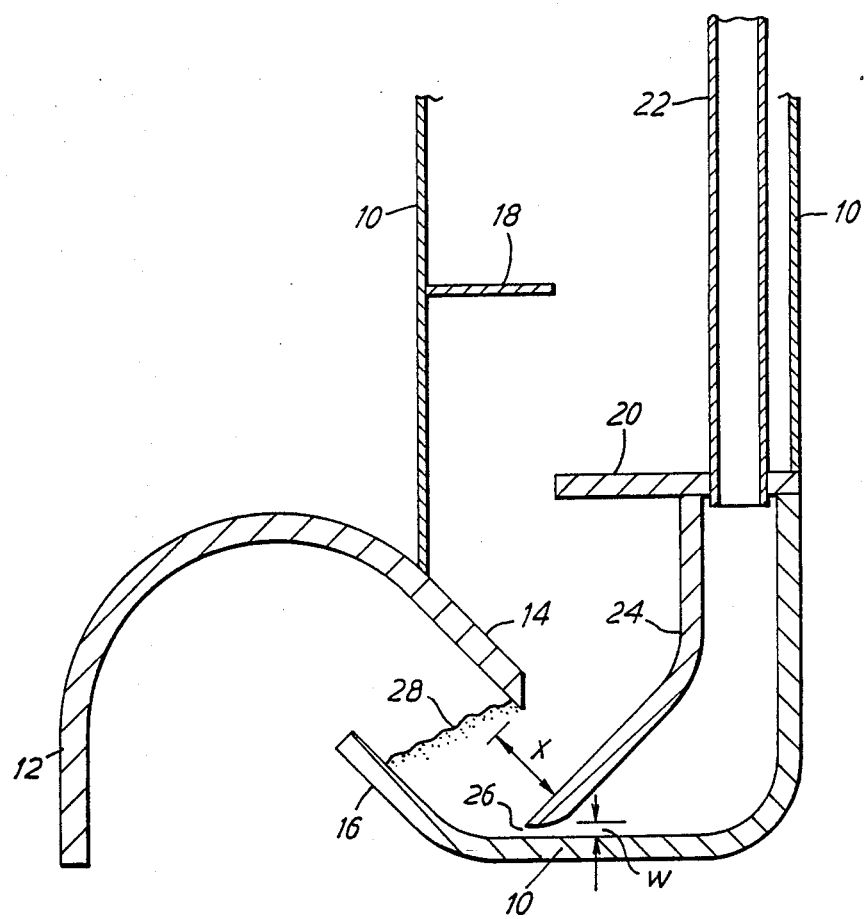
FIG. 1 is a vertical section through apparatus according to the invention.

The apparatus illustrated is designed to feed alumina from a hopper (not show) to a reduction cell. The length of the slot 26 is 63.5 mm, the same as the width of the passage, so obviously this figure is not critical and could be altered at will to suit the requirements of the feed system. The width of the slot is chosen at 3.2 mm, sufficient to provide an adequate flow of low-pressure gas to move the alumina. The dimension x at the entrance of the chicane is 23 mm sufficiently small to control alumina flow but not so small as to risk blockage. This constriction is positioned immediately upstream of the slot 26; there should be no greater constriction downstream of the slot.

When the gas supply to the pipe 22 is switched off, the alumina comes to rest with a surface in the chicane shown as 28 at its characteristics angle of repose. In order to feed alumina to a reduction cell positioned beneath the apparatus, air at low pressure, 0.49 to 1.96kPa, (50 to 200 mm of water) is introduced into the tube 22. This directs the air into the distribution chamber 24 which ensures a uniform air pressure along the length of the slot 26. Low pressure air flowing at low speed from this slot forms a cushion on the lower wall 16 of the chicane which causes a breakdown of the alumina surface 28. This causes the alumina to flow at low speed round the chicane and into the downstream section 12 of the passage. So long as the gas flow continues, alumina continuously flows at a slow rate down the upstream section of the passage, round the chicane and into the downstream section. When the gas flow is stopped, the alumina flow stops. The gas flow can be controlled by a timer (not shown) which in turn can be controlled by response to the operating conditions in the cell.

The apparatus of the invention has the following advantages:

Less expensive than prior systems involving fluidized beds; easy to fabricate from standard components; easily installed in different locations.

Applicable to a wide variety of particulate materials and operations; not restricted to feed of alumina to reduction cells.

Permits slow feeding over a long time period.

Avoids sand-blasting problems that result from use of high-pressure gas.

No moving parts - very little maintenance even in the long term.

Unaffected by dust, humidity or oil which may be present in the air supply; operable over a wide temperature range.

Alumina fed to aluminium electrolysis cells, which operate normally between 95° C. to 970° C., should be as hot as possible to accelerate dissolution in the electrolyte.

Another embodiment of the invention allows a portion of the total feed of alumina to be preheated in a chamber which is exposed to hot gases and radiation from the cell.

The passage for feeding particulate material is increased in length, and optionally diameter, between the upstream section, below the baffle system, and the chicane. The outlet of the feeder is thus brought closer to the hole broken in the crust to feed alumina and a preheating chamber is created where the particulate material is heated during a residence time of typically several minutes prior to the feeding of the alumina into the cell.

Feeding rate will be faster in the first seconds of feeder actuation as the preheating chamber empties with little flow restriction. Thus, feeding time must be shortened accordingly in order to deliver the same quantity of material to the cell.

At the end of the feeding cycle, for a fraction of the total feeding cycle which depends upon preheating chamber capacity with respect to total feed, the feeding rate decreases to the rate of flow of particulate material through the baffle section.

The total accuracy of the feed depends, partially, on the constancy of particulate material density. However, since the material flows in the preheating chamber under gravity, density variations are insignificant.

Figure 2:
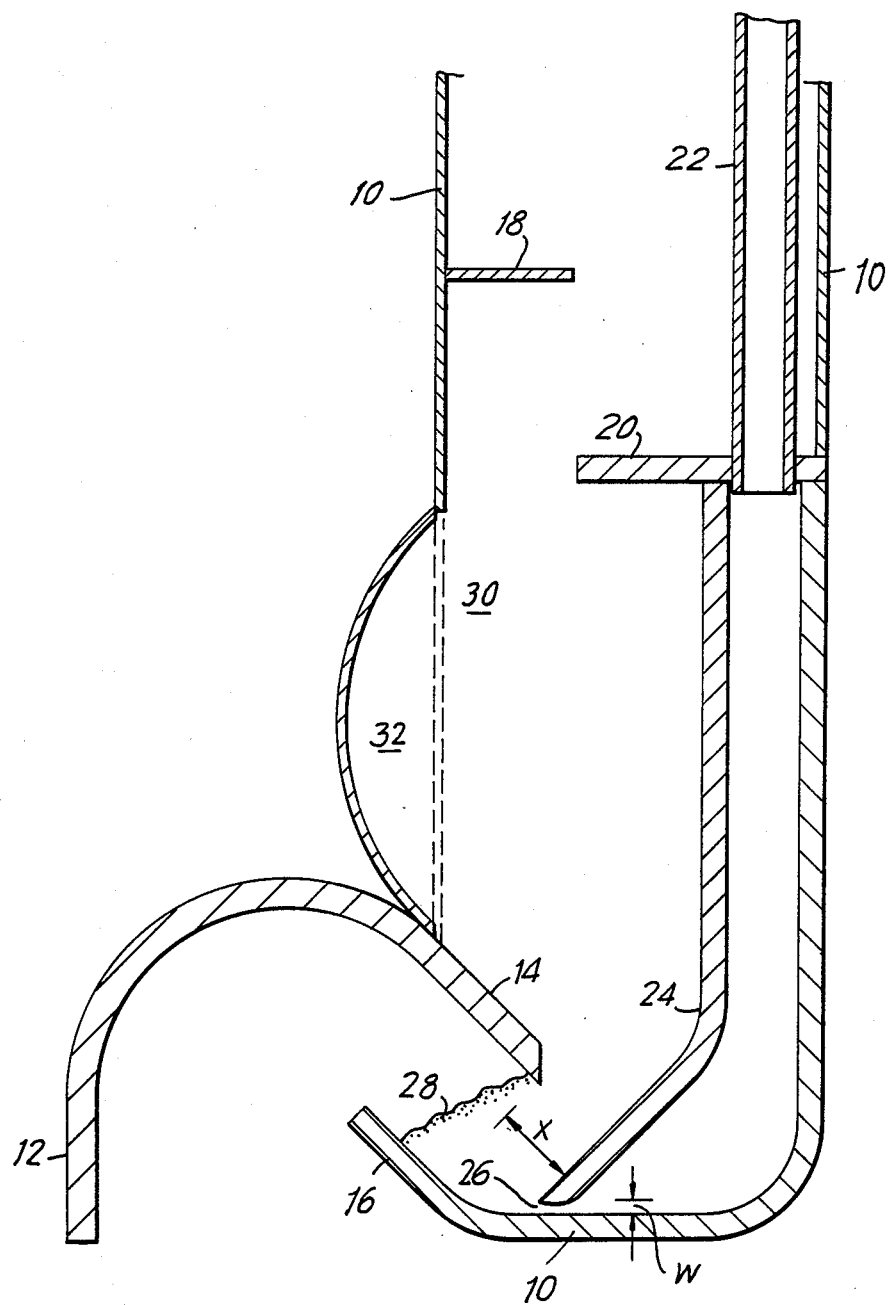
FIG. 2 is a vertical section through apparatus used according to the method of the invention including a preheating chamber.

Referring to FIG. 2 the apparatus is as shown in FIG. 1 with the exception that between the upper wall 14 and the baffle 20 the passage for feeding particulate material is increased in length to provide a preheating chamber 30. A preheating chamber of greater capacity may be provided by also increasing the diameter of the passage 32.

When the gas supply is switched on alumina flows at low speed round the chicane and into the downstream section 12 of the passage. Initially the alumina flows at a rate dictated by the restriction to flow caused by the chicane. The rate of flow then reduces to that rate allowed by the flow through the baffle system. Alumina continues to flow around the chicane until the gas flow is stopped.

EXAMPLE

The apparatus described and illustrated was operated using a timer to switch on a gas flow at a pressure of 1.77kPa (18 cm of water) in the pipe 22 for periods of 16 seconds. The amount of alumina delivered on each shot was 1.878 kg with a standard deviation of 0.097 kg on thirty individual measurements.

I claim:

1. A method of feeding particulate material by the use of apparatus comprising a passage having a floor, an upstream section for receiving the material and conveying it in a downward direction, and a downstream section for delivering the material, the two sections being connected by a chicane consisting of a horizontal or upwardly inclined section of the passage of sufficient length to cause the particulate material to come to rest therein in the absence of a flow of gas there-through, a baffle system in the upstream section comprising at least two baffles mounted on opposite sides of the upstream section of the passage to cause the particulate material to follow a tortuous path round them to control the rate of flow of the material to the chicane, a pipe leading to a slot within the passage, the slot extending horizontally adjacent the floor of the passage and facing downstream near the upstream end of the chicane, which method comprises passing through the slot air compressed at a pressure below one meter of water gauge and starting and stopping the passage of air at predetermined intervals so as to start and stop the flow of the particulate material.

2. The method of claim 1 wherein the pressure of the compressed air is between 50 and 200 mm of water gauge.

3. The method of claim 1 wherein a preheating chamber for the particulate material is provided between the upstream section, below the baffler system, and the chicane.

4. A method according to claim 1 wherein the air is introduced into the pipe which connects with a distribution chamber so as to ensure constant air pressure across the slot, the slot being positioned so as to be immersed at all times in the particulate material and such that the air from the slot is caused to flow across the floor of the chicane such that the base of the pile of particulate material is disturbed sufficiently to cause particulate material to flow under gravity round the chicane.

* * * * *